(12) United States Patent  
Ganser

(10) Patent No.: US 8,164,829 B2  
(45) Date of Patent: Apr. 24, 2012

(54) SYSTEM FOR RECORDING AND REPRESENTING IMAGES OF PREPARATIONS

(75) Inventor: Michael Ganser, Giessen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1549 days.

(21) Appl. No.: 11/569,651

(22) PCT Filed: Apr. 7, 2005

(86) PCT No.: PCT/EP2005/051537  
§ 371 (c)(1),  
(2), (4) Date: Nov. 27, 2006

(87) PCT Pub. No.: WO2005/116718  
PCT Pub. Date: Dec. 8, 2005

(65) Prior Publication Data  
US 2009/0160994 A1 Jun. 25, 2009

(30) Foreign Application Priority Data  
May 25, 2004 (DE) .................. 10 2004 026 093

(51) Int. Cl.  
G02B 21/06 (2006.01)  
G02B 21/36 (2006.01)  
G02B 21/26 (2006.01)

(52) U.S. Cl. .................. 359/385; 359/369; 359/393

(58) Field of Classification Search .......... 359/368–398; 715/700–867  
See application file for complete search history.

(56) References Cited

U.S. PATENT DOCUMENTS

| 4,202,037 | A | 5/1980 | Glaser et al. |
|---|---|---|---|
| 4,691,997 | A | 9/1987 | Muchel et al. |
| 5,671,085 | A * | 9/1997 | Gustafsson et al. .......... 359/385 |
| 6,151,161 | A * | 11/2000 | Mayer et al. .................. 359/392 |
| 6,268,957 | B1 * | 7/2001 | Hoover et al. ................ 359/368 |
| 6,297,799 | B1 * | 10/2001 | Knittel et al. ................ 345/419 |
| 6,404,849 | B1 * | 6/2002 | Olson et al. ..................... 378/79 |
| 6,452,625 | B1 | 9/2002 | Kapitza et al. |
| 6,496,307 | B2 | 12/2002 | Engelhardt et al. |
| 7,031,055 | B2 * | 4/2006 | Engelhardt et al. .......... 359/385 |
| 2001/0002862 | A1 | 6/2001 | Okahira et al. |
| 2002/0060842 | A1 | 5/2002 | Ogino et al. |
| 2002/0090127 | A1 | 7/2002 | Wetzel et al. |
| 2002/0176160 | A1 | 11/2002 | Suzuki et al. |
| 2003/0011883 | A1 * | 1/2003 | Ogihara ........................ 359/391 |
| 2003/0179445 | A1 * | 9/2003 | Maenle et al. ................. 359/368 |
| 2003/0210262 | A1 * | 11/2003 | Gahm et al. .................. 345/732 |

(Continued)

FOREIGN PATENT DOCUMENTS  
CA 2386142 4/2001  
(Continued)

*Primary Examiner* — George C Neurauter  
(74) *Attorney, Agent, or Firm* — Leydig, Voit & Mayer, Ltd.

(57) ABSTRACT

A system for acquiring and displaying images of preparations is provided. The system includes a first and second illumination device, each including an illumination source defining a respective illumination beam path amid configured to emit light to illuminate the preparation. A camera and a display for displaying a portion of the preparation are further provided. The preparation can be placed on a stage that is movable in x and y coordinate directions. The frame is also provided with a combining device configured to combine the first imaging beam path and the second imaging beam path, and direct them to the camera.

30 Claims, 6 Drawing Sheets

U.S. PATENT DOCUMENTS

| | | | |
|---|---|---|---|
| 2004/0201884 A1* | 10/2004 | Deverin et al. | 359/385 |
| 2010/0118394 A1* | 5/2010 | Hecker | 359/385 |
| 2010/0302631 A1* | 12/2010 | Hing et al. | 359/385 |

FOREIGN PATENT DOCUMENTS

| | | |
|---|---|---|
| DE | 3508306 | 9/1986 |
| DE | 298853 | 5/1996 |
| DE | 196 09 288 | 9/1996 |
| DE | 19635666 | 12/1997 |
| DE | 10004233 | 8/2001 |
| DE | 101 54 271 | 9/2002 |
| JP | 05 322783 | 12/1993 |
| WO | 01/26541 | 4/2001 |
| WO | WO-0126541 | 4/2001 |
| WO | 03/034097 | 4/2003 |

* cited by examiner

SYSTEM FOR RECORDING AND REPRESENTING IMAGES OF PREPARATIONS

CROSS REFERENCE TO PRIOR APPLICATION

This is a U.S. national phase application under 35 U.S.C. §371 of International Patent Application No. PCT/EP2005/051537, filed Dec. 8, 2005, and claims benefit of German Patent Application No. 10 2004 026 093.1, filed May 25, 2004, which is incorporated by reference herein. The International Application was published in German on Dec. 8, 2005 as WO 2005/116718 A1 under PCT Article 21(2).

FIELD OF THE INVENTION

The present invention relates to a system for acquiring and displaying images of preparations. In particular, the present invention relates to a system for acquiring and displaying images of preparations, the system including a frame, at least two illumination devices which emit light for illuminating the preparation, a camera, a display for displaying at least one image of a portion of the preparation, and a stage which is movable in an x and y coordinate direction and used for placing the preparations thereon.

BACKGROUND OF THE INVENTION

US Patent Application No. 2002/0176160 A1 is directed to a microscope system. The microscope system includes a stage that is movable in x and y coordinate directions. The stage and the optical means of the microscope system are completely enclosed by a housing. The stage can be moved out of the housing through an opening in the housing, so that a sample to be examined may be placed on the stage. The stage can then be completely drawn into the housing for examination of the sample. Inside the housing, a plurality of objective lenses is mounted on a holder. Also integrated in the housing is a CCD chip and an illumination source. Many of the components are motor-adjustable inside the housing.

US Patent Application No. 2003/0011883 A1 describes a microscope system. The microscope system includes a stage that is movable in x and y coordinate directions. Also provided is a lens turret, which has formed therein a plurality of openings for receiving an objective lens. Moreover, a TV camera having a CCD chip is mounted on the stand of the microscope. The microscope system is additionally provided with a monitor and a control device. The control device controls the electrically driven stage. The position of the stage can be detected by linear encoders. Using a mouse, the user can input a desired position to which the stage will then be moved correspondingly.

U.S. Pat. No. 4,202,037 is directed to a computer microscope. A computer is connected to a conventional light microscope in a closed-loop feedback system, which allows for user intervention. The graphics tablet, together with an electrical stylus, allows input to the computer. An image on the display can be superimposed on a sample via a beam splitter provided on the microscope. The superposition of images takes place directly in the field of view of the microscope.

German Laid-Open Application DE 196 09 288 A1 is directed to a compact microscope, especially for routine medical applications. The microscope takes the form of a closed housing into which the preparation to be examined is drawn in through an insertion opening. All optical components are mounted within the housing. Alternatively, the microscope is insertable into the standard bay of a computer. All movable components of the microscope are motor-driven and software-controlled by the computer. The preparation can be moved inside the microscope in two mutually perpendicular directions for selecting the sample's details of interest. When the preparation is drawn in, a line sensor generates an overview image of the preparation.

Document CA 2386142 A1 describes a system for telepathology. The system includes a plurality of individual devices (a high-resolution scanner, a microscope with a digital camera, and a computer with a color monitor). The image of the entire slide is produced by the high-resolution scanner.

SUMMARY OF THE INVENTION

It is, therefore, an object of the present invention to provide a system for acquiring and displaying images of preparations, which is easy to use and allows for both macroscopic imaging of the slides and microscopic imaging of a portion of a preparation on the slide.

In accordance with an embodiment of the present invention, a system for acquiring and displaying images of preparations is provided. The system includes two or more illumination devices each having a respective illumination source. Each illumination source defines an illumination beam path, and each illumination device is configured to emit light for illuminating the preparation. The system further includes a camera, and a display for displaying an image that includes a portion of the preparation. A stage that is movable in x and y coordinate directions is used for placing the preparations thereon. A frame is also provided with the first and second illumination source and a combining means by which the first imaging beam path and the second imaging beam path are combined and directed to the camera.

BRIEF DESCRIPTION OF THE DRAWINGS

In conjunction with the explanation of the preferred exemplary embodiments of the present invention with reference to the drawing, an explanation is also given of generally preferred embodiments and refinements of the teaching. In the drawings.

DETAILED DESCRIPTION OF CERTAIN PREFERRED EMBODIMENT

Figure 1:
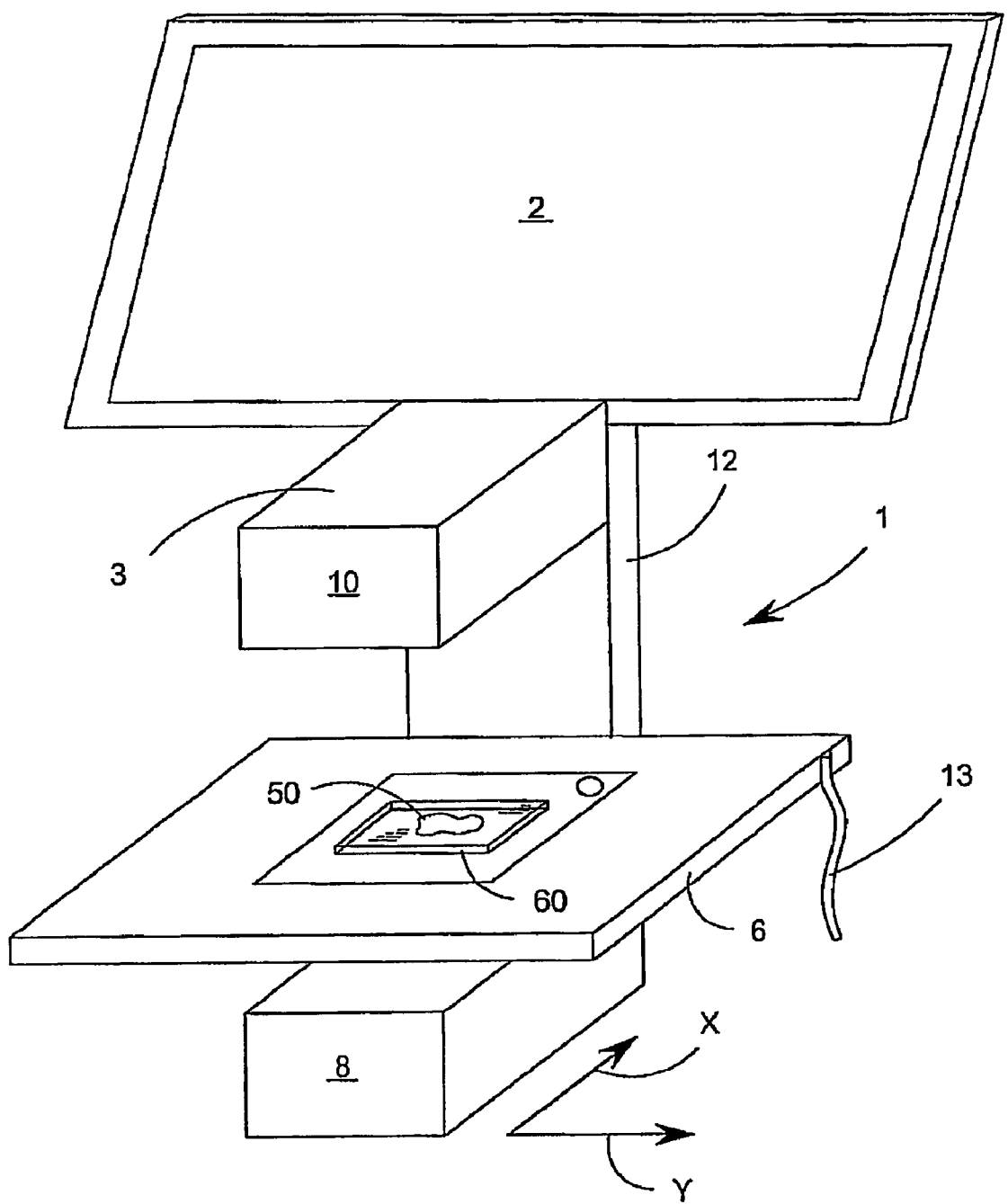
FIG. 1 is a perspective view of the system for acquiring and displaying images of preparations.

It is advantageous if the system has a first illumination source and a second illumination source provided in the frame. In this case, the first illumination source defines a first illumination beam path and the second illumination source defines a second illumination beam path. The frame further has provided therein a combining means by which a first imaging beam path and a second imaging beam path are combined and directed to the camera.

The frame of the system can be C-shaped and includes a lower frame section, an upper frame section, and a connecting section. The connecting section connects the upper frame section and the lower frame section. The frame has the form of a C-shaped microscope stand which has no tube for visual observation of the preparation. An incident light illumination device is provided on the upper frame section. The stage is mounted on the lower frame section. Furthermore, the stage has a securing means for securing the preparation in order to hold it in a plane defined by the X and Y coordinate directions. The stage is an encoded stage. This means that the movement of the stage in the X and Y coordinate directions is measured by suitable displacement sensors. The acquired data can then be transferred to the control and monitoring unit or a computer to allow the current position(s) of the illumination beam path and/or imaging beam path on the slide to be indicated on said computer. The stage includes an actuating element by means of which the first section of the slide, which carries the sample, can be moved in the X coordinate direction into the first illumination beam path or second illumination beam path. Similarly, the stage may be designed to be movable by the actuating element in the Y coordinate direction in such a manner that the first section of the slide, which carries the sample, and the second section of the slide, which carries the identifier, can be moved back and forth in the first illumination beam path.

The preparation includes a slide that can be is divided into a first section and a second section, the first section carrying a sample and the second section carrying an identifier.

The upper frame section has provided therein a path-folding means which folds the first illumination beam path and deflects light from the first illumination source into the first imaging beam path and directs it to the camera. The upper frame section further has provided therein a combining means which also acts as a path-folding means and directs light from the second illumination source to the camera and combines the light in the first imaging beam path and in the second imaging beam path. The path-folding means and the combining means are in the form of reflective elements which are inclined by 45° with respect to a horizontal line.

It is advantageous if the camera is in the form of a digital camera and that the images acquired by the digital camera can be displayed on the display.

The display is disposed behind the frame in such a manner that a user sitting in front of the frame or system and positioning slides on the stage is able to view the images acquired by the camera and/or the data generated by the computer without changing position.

In the first illumination beam path or imaging beam path, it is possible to acquire a macroscopic image of the first section of the slide and a macroscopic image of the second section of the slide. In the second illumination beam path or imaging beam path, it is possible to acquire at least one microscopic image of a portion of the first section of the slide. The slide is provided with a machine-readable or a directly readable identifier in the second section, said identifier being detected by the digital camera. In another embodiment, the identifier may be composed of a machine-readable identifier and a directly readable identifier.

It is advantageous if the display and the frame together form one unit. In this case, the display is fixedly connected to the frame of the system.

FIG. 1 is a perspective view of system 1 for acquiring and displaying images of preparations 50 (see FIG. 7 and FIG. 8) which are applied to a slide 60. System 1 includes a frame 3 which carries at least two illumination devices 4a and 4b (see FIG. 3). Illumination devices 4a and 4b emit light for illuminating preparation 50. Frame 3 has provided therein a camera 5 which acquires an image of at least a portion of preparation 50. In the embodiment shown in FIG. 1, frame 3 has mounted thereon a display 2 for displaying the acquired image and additional information for the user regarding the examination of preparation 50. The frame is further provided with a stage 6 which is movable in x and y coordinate directions and used for placing preparations 50 thereon. Frame 3 is preferably C-shaped and includes a lower frame section 8, an upper frame section 10, and a connecting section 12. Connecting section 12 connects upper frame section 10 and lower frame section 8. Stage 6 is mounted on lower frame section 8. Stage 6 has a securing means for securing a slide 60 containing the preparation 50, whereby the preparation is held in a plane defined by the X and Y coordinate directions. The stage 6 includes an actuating element 13 by means of which the first section of the slide, which carries the sample, can be moved in the X coordinate direction, and may be designed to be movable by the actuating element in the Y coordinate direction.

Figure 2:
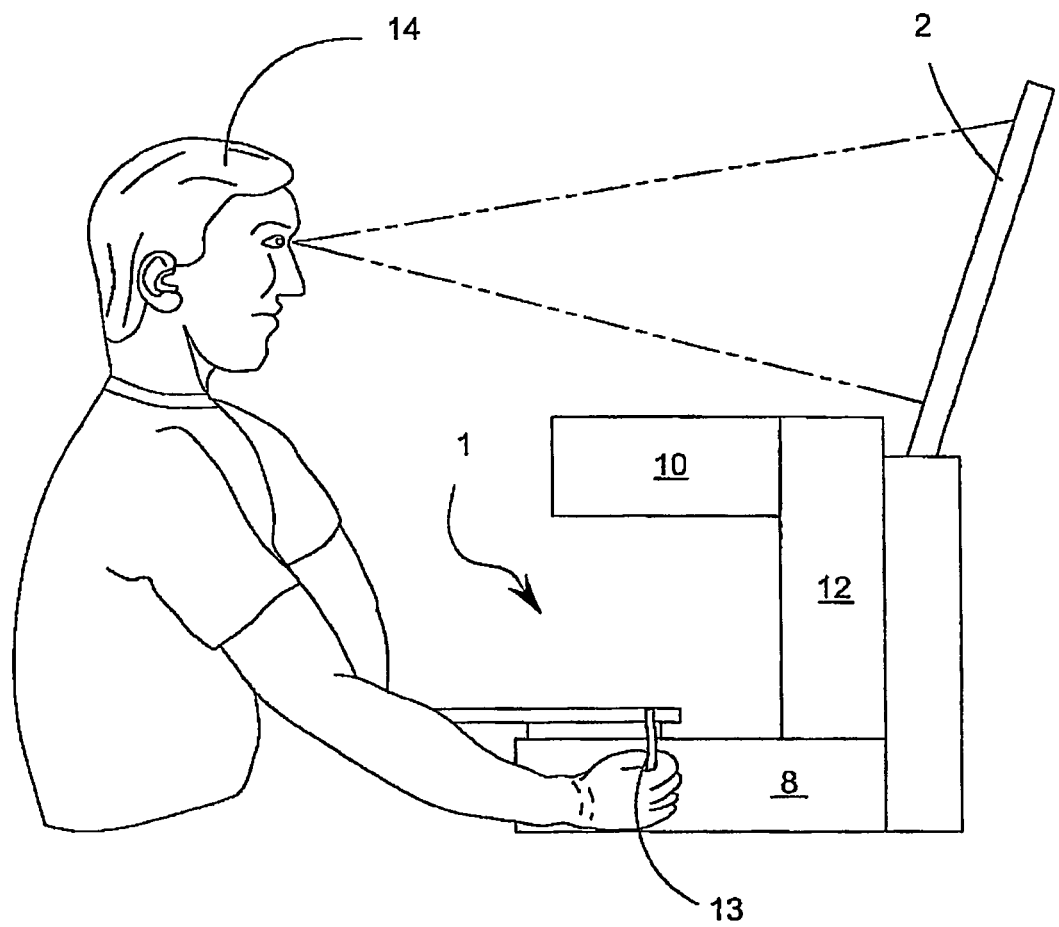
FIG. 2 is a side view of the system according to the present invention, schematically showing a user to illustrate the ergonomic arrangement.

FIG. 2 is a side view of system 1 according to the present invention, schematically showing a user 14 to illustrate the ergonomic arrangement of system 1. System 1 does not have an eyepiece. The acquired images of preparation 50 are viewed by the user on display 2. Display 2 is disposed behind frame 3 of system 1. Display 2 is arranged such that no parts of frame 3 are in the field of view of user 14 toward display 2. The user is positioned in front of system 1 in a way that places the entire display 2 in his/her field of view, at least giving him/her an unobstructed view of the middle of display 2.

Figure 3:
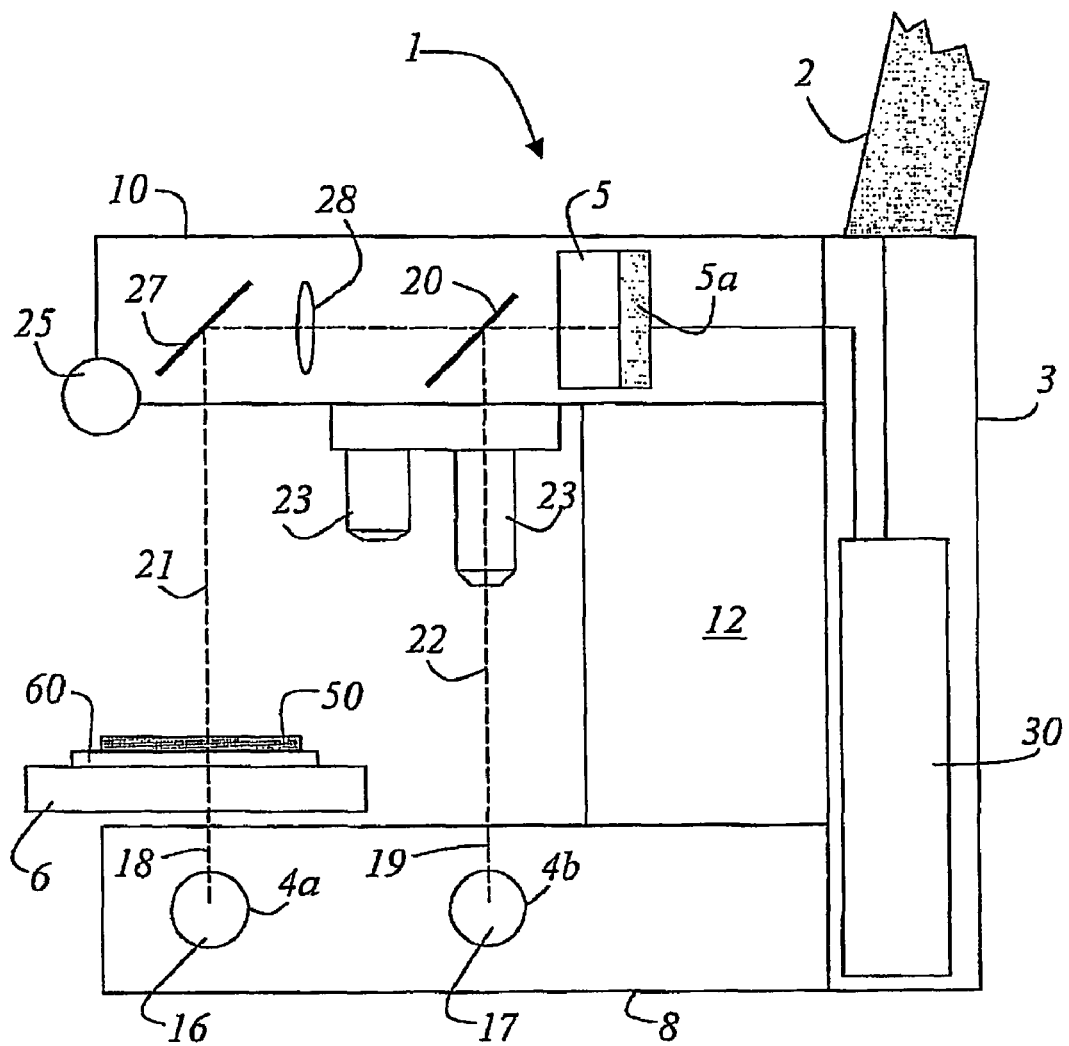
FIG. 3 is a schematic side view of the system, illustrating the internal construction of the system.

FIG. 3 is a schematic side view of system 1, illustrating the internal construction of system 1. Frame 3 has provided therein a first illumination source 16 and a second illumination source 17. First illumination source 16 defines a first illumination beam path 18 and second illumination source 17 defines a second illumination beam path 19. Frame 3 further has provided therein a combining means 20 by which a first imaging beam path 21 and a second imaging beam path 22 are combined and directed to camera 5. Camera 5 essentially includes a CCD chip 5a. A plurality of objective lenses 23 of different magnification can be moved into second illumination beam path 19 or second imaging beam path 22. Objective lenses 23 can, for example, have a magnification of 5 times to 60 times. Objective lenses 23 can be moved into second illumination beam path 19 or second imaging beam path 22, for example, by a turret. First illumination source 16 is provided in first illumination beam path 18. Moreover, first illumination source 16 is disposed in lower frame section 8. Frame 3 has the form of a C-shaped microscope stand, but, as mentioned earlier, has no tube with an eyepiece for visual observation of preparation 50. Upper frame section 10 has provided thereon an incident light illumination device 25 which directs light to slide 60 to acquire a reflected light image of at least a portion of slide 60. In upper frame section 10, there is provided a path-folding means 27 which folds first illumination beam path 18 and deflects light from first illumination source 16 into first imaging beam path 18 and directs it to camera 5. Combining means 20 provided in upper frame section 10 also acts as a path-folding means for directing light from second illumination source 17 to camera 5 or CCD chip 5a. The light in first imaging beam path 21 and in second imaging beam path 22 is combined by combining means 20. Path-folding means 27 and combining means 20 are in the form of reflective elements which are inclined by 45° with respect to a horizontal line. An optical system 28 is provided between path-folding means 27 and combining means 20. Optical system 28 is used for imaging the slide 60 in first illumination beam path 18 or second imaging beam path 21. Combining means 20 may be in the form of a semi-transparent optical element. Combining means 20 may take the form of a switchable reflective element. "Switchable" is understood to mean that, for example, combination means 20 can be swung out of second imaging beam path 22. The frame of system 1 accommodates monitoring and control electronics 30. Monitoring and control electronics 30 are used for switching the first or second illumination device 4a or 4b according to the movement of X/Y stage 6. First illumination beam path 18 or first imaging beam path 21 is designed for incident and transmitted illumination and, further, is suitable for low magnifications (for example, of a factor of 0.3) onto the CCD chip of camera 5. First illumination beam path 18 or first imaging beam path 21 is spaced by about twenty-five millimeters from second illumination beam path 19 or second imaging beam path 22. Switching between first illumination beam path 18 or first imaging beam path 21, which allows macroscopic imaging of at least a portion of slide 60, and second illumination beam path 19 or second imaging beam path 22, which allows microscopic imaging of the preparation, is done electrically and/or by a motor. As mentioned earlier, monitoring and control electronics 30 are used for switching of illumination devices 4a or 4b according to the position of X/Y stage 6. First illumination beam path 18 and second illumination beam path 19 are switched correspondingly. For example, when placing a typical preparation (see FIG. 7 or FIG. 8) on X/Y stage 6, said X/Y stage 6 is subsequently moved in such a way that first section 61 of slide 60 is located in the optical axis of first illumination beam path 18. A macroscopic image is acquired of the sample on slide 60. Then, X/Y stage 6, together with slide 60, is moved further in X coordinate direction 9, so that a macroscopic image can be acquired of second section 62. In order to image identifier 65 in second section 62, the illumination is generally switched to incident light mode. Subsequent to taking the macroscopic images of first and/or second section 61, 62, the stage is moved in Y coordinate direction 11. The preparation is moved into second illumination beam path 19. The preparation can be microscopically examined using a sufficiently high optical magnification. FIG. 3 also shows the embodiment in which display 2 is fixedly connected to system 1. The view of FIG. 3 shows only a portion of the display. It is also possible for display 2 to be positioned separately to meet the requirements described in FIG. 2.

Figure 4:
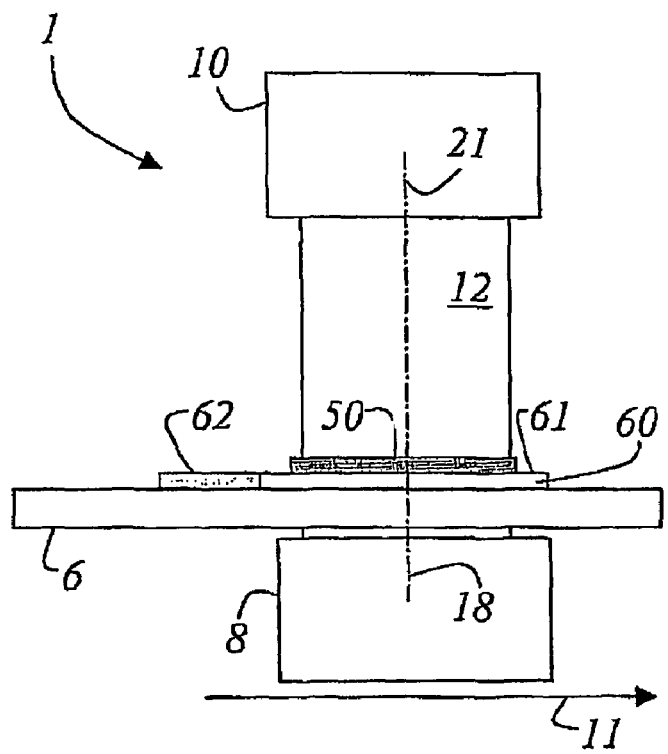
FIG. 4 is a schematic front view of the system, showing the X/Y stage in the position for acquiring an overview image of the preparation.
Figure 7:
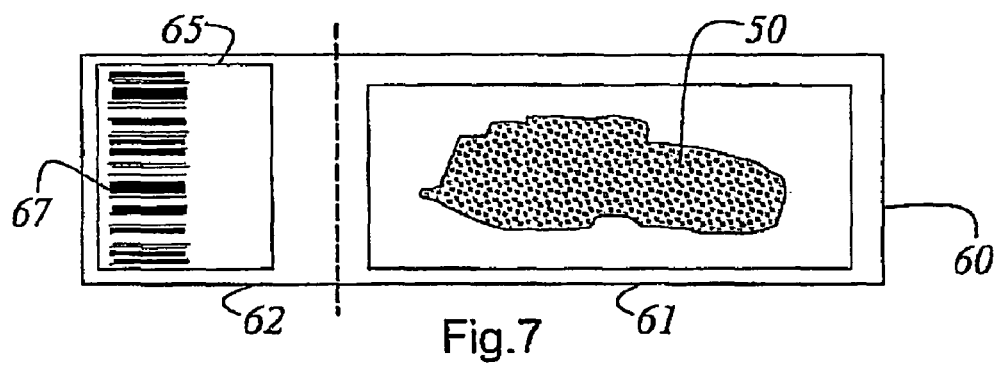
FIG. 7 is a schematic view of a slide having a machine-readable identifier.
Figure 8:
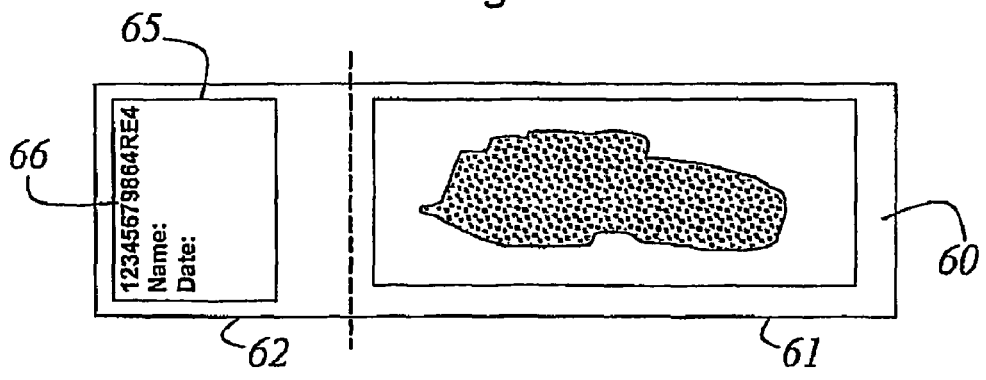
FIG. 8 is a schematic view of a slide having a machine-readable identifier.

FIG. 4 is a schematic front view of system 1, showing X/Y stage 6 in the position for acquiring an overview image (macroscopic image) of at least a portion of slide 60. In the front view of FIG. 4, display 2 has been omitted. It is obvious that display 2 cannot be an integral part of system 1. As shown in FIG. 7 or FIG. 8, slide 60 is divided into a first section 61 and a second section 62. First section 61 carries a sample or preparation 50 and second section 62 is provided with an identifier 65. In the view shown in FIG. 4, X/Y stage 6 is positioned in X coordinate direction 9 in such a way that the first section of the slide is located in first illumination beam path 18 or imaging beam path 21. Thus, a macroscopic image is acquired of first section 61 of slide 60.

Figure 5:
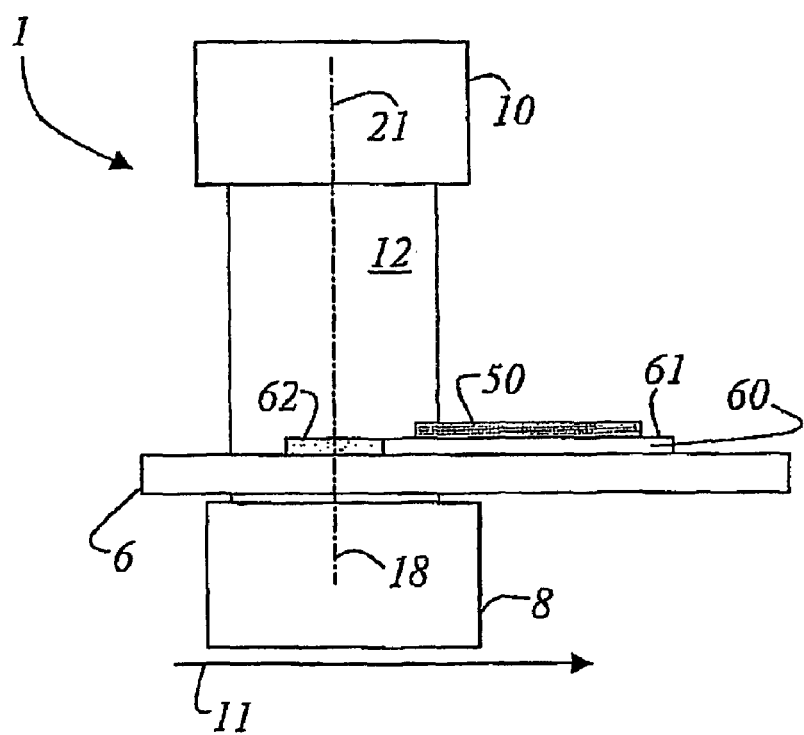
FIG. 5 is a schematic front view of the system, showing the X/Y stage in the position for acquiring an image of an identifier on the slide.

In order to acquire a macroscopic image of second section 62 of slide 60, said slide is moved in X coordinate direction 9 in such a way that second section 62 containing identifier 65 is located in first illumination beam path 18 or imaging beam path 21. The position in which X/Y stage 6 is located for imaging identifier 65 is shown in FIG. 5.

Figure 6:
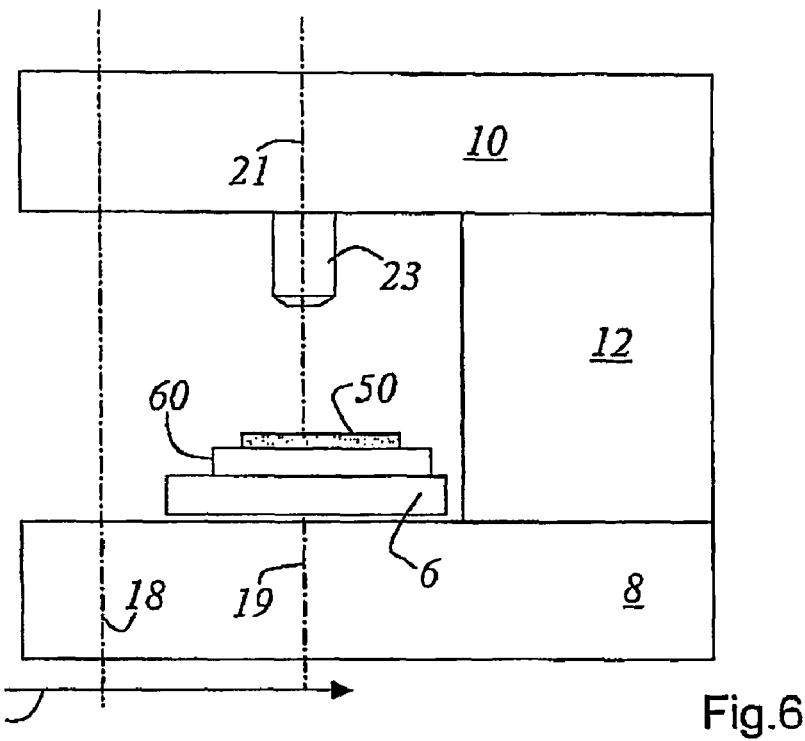
FIG. 6 is a side view of the system, showing the X/Y stage in the position for acquiring a microscopic image of the preparation.

FIG. 6 is a side view of system 1, showing X/Y stage 6 in the position for acquiring a microscopic image of preparation 50. In order to acquire a microscopic image of preparation 50, X/Y stage 6 is moved substantially in Y coordinate direction 11 to move at least a portion of preparation 50 into second illumination beam path 19 or second imaging beam path 21. Moreover, it is possible to select a suitable objective lens 23 to perform microscopic imaging. Objective lens 23 may be swung into second illumination beam path 19 or second imaging beam path 21, manually or by a motor. X/Y stage 6 has at least 75 mm of travel in X coordinate direction 9 and at least 50 mm of travel in Y coordinate direction 11. The suitably selected length of travel allows preparation 50 to be moved into first illumination beam path 18 and subsequently into second illumination beam path 19. When placing slide 60 on X/Y stage 6, first a macroscopic image is produced of first section 61 on slide 60.

FIG. 7 is a schematic view showing a slide 60 whose identifier 65 is a machine-readable identifier 67. Machine-readable identifier 67, which is in the form of a bar code 68 and is located in second section 62, is detected by camera 5, and the program provided in a computer translates bar code 68 in such a manner that the information contained in bar code 68 can be displayed in a readable form on display 2. The sample or preparation 50 to be examined is placed in first section 61.

FIG. 8 is a schematic view showing a slide 60 whose identifier 65 is a readable identifier 66. Readable identifier 66 located in second section 62 is detected by camera 5, and the program provided in a computer translates the readable code in such a manner that it can be displayed on display 2. The sample or preparation 50 to be examined is placed in first section 61.

Figure 9:
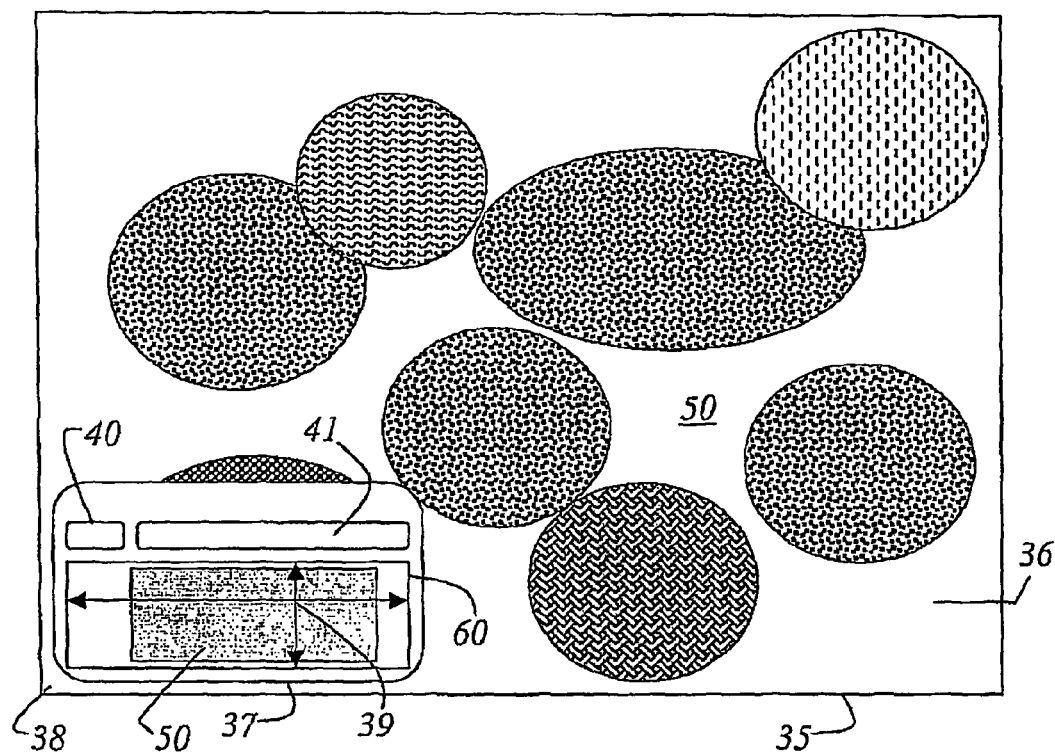
FIG. 9 is a view of a user interface.

FIG. 9 is a view showing a user interface 35 which is displayed on display 2. The representation on display 2 is divided into a first window 36 and a second window 37. In this embodiment, second window 37 is displayed as a small window in the bottom left corner 38 of display 2. The microscope image of preparation 50 is displayed on the entire display 2. In second window 37, a pair of cross hairs 39 is displayed which indicates the position in preparation 50 at the which the microscopic image of preparation 50 is currently displayed in first window 36. Since the movement of X/Y stage 6 in X coordinate direction 9 and Y coordinate direction 11 is encoded, the position may be represented in the form of the pair of cross hairs 39 in second window 37 for each position of X/Y stage 6. The pair of cross hairs 39 serves the user as an aid for navigating preparation 50 when taking microscopic images of preparation 50. Second window 37 further has provided therein a first and second control button 40 or 41. Using a control button 40 or 41, it is possible, for example, to trigger the acquisition and storage of an image.

LIST OF REFERENCE NUMERALS 1 system
2 display
3 frame
4a illumination device
4b illumination device
5 camera
5a CCD chip
6 X/Y stage 7 securing means
8 lower frame section
9 X coordinate direction
10 upper frame section
11 Y coordinate direction
12 connecting section
13 actuating element
14 user
16 first illumination source
17 second illumination source
18 first illumination beam path
19 second illumination beam path
20 combining means
21 first imaging beam path
22 second imaging beam path
23 objective lenses
25 incident light illumination device
27 path-folding means
28 optical system
30 monitoring and control electronics
32 computer
35 user interface
36 first window
37 second window
38 bottom left corner
39 pair of cross hairs
40 first control button
41 second control button
50 preparation
60 slide
61 first section
62 second section
65 identifier
66 readable identifier
67 machine-readable identifier
68 barcode

What is claimed is:

1. A system for acquiring and displaying images of preparations, the system comprising:
   a movable stage movable in x and y coordinate directions and configured to receive a preparation thereon in a plane defined by the x and y coordinate directions;
   a first illumination device including a first illumination source defining a first illumination beam path and configured to emit light for illuminating the preparation so as to form a first imaging beam path, and a second illumination device including a second illumination source defining a second illumination beam path and configured to emit light for illuminating the preparation so as to form a second imaging beam path, the first and second illumination beam paths being spaced apart at the plane defined by the x and y coordinate directions;
   a camera;
   a display configured to display at least one image including a portion of the preparation;
   a combining device configured to combine the first and a second imaging beam paths and direct the combined paths to the camera; and
   a frame configured to receive the first and second illumination sources and the combining device.

2. The system as recited in claim 1 wherein the frame includes a C-shaped section, a lower frame section, an upper frame section and a connecting section, the connecting section connecting the upper frame section and the lower frame section.

3. The system as recited in claim 1 wherein the frame includes a C-shaped microscope stand, the frame being free of any tube for visual observation of the preparation.

4. The system as recited in claim 2 further comprising an incident light illumination device disposed on the upper frame section.

5. The system as recited in claim 2 wherein the movable stage is mounted on the lower frame section, and the stage has a securing device for securing the preparation so as to hold the preparation in the plane defined by the X coordinate direction and Y coordinate direction.

6. The system as recited in claim 5 wherein the preparation includes a slide divided into a first section and a second section, the first section configured to carry a sample and the second section configured to carry an identifier.

7. The system as recited in claim 5 wherein the movable stage comprises an encoded stage.

8. The system as recited in claim 5 wherein the movable stage includes an actuating element configured to move a first section of a slide in the X coordinate direction into the first or second illumination beam path the first section of the slide carrying the preparation.

9. The system as recited in claim 8 wherein the movable stage is movable by the actuating element in the Y coordinate direction so that the first section of the slide and a second section of the slide can be moved back and forth in the first illumination beam path, the second section of the slide configured to carry an identifier.

10. The system as recited in claim 1 wherein the frame includes an upper frame section and further comprising a path-deflecting device configured to deflect the first light from the first illumination source in the first imaging beam path and direct the first light to the camera.

11. The system as recited in claim 1 wherein the combining device is disposed on an upper frame section of the frame and the combining device is configured to deflect and direct light from the second illumination source to the camera.

12. The system as recited in claim 11 further comprising an optical system and a path deflecting device, the optical system being disposed between the path-deflecting device and the combining device.

13. The system as recited in claim 12 wherein the path-deflecting device and the combining device include a reflecting element inclined by 45' with respect to a horizontal line.

14. The system as recited in claim 11 wherein the combining device includes a switchable reflective element.

15. The system as recited in claim 1 wherein the frame is configured to receive monitoring and control electronics.

16. The system as recited in claim 1 further comprising a computer.

17. The system as recited in claim 1 wherein the camera includes a digital camera configured to acquire images to be displayed on the display.

18. The system as recited in claim 1 wherein the display is disposed behind the frame so that a user sitting in front of the frame and positioning slides on the stage is able to view at least one of the images acquired by the camera and data generated by the computer without changing position.

19. The system as recited in claim 1 wherein the preparation includes a slide having a first and second section, and a macroscopic image of the first section and a macroscopic image of the second section or the slide can be acquired by the camera in at least one of the first illumination beam path and the imaging beam path.

20. The system as recited in claim 1 wherein the preparation includes a slide having a first and second section, and at least one microscopic image of a portion of the first section can be acquired by the camera in at least one of the second illumination beam path and the imaging beam path.

21. The system as recited in claim 19 wherein the second section of the slide includes at least one of a machine-readable identifier and a directly readable identifier, and the camera includes a digital camera configured to detect the at least one of a machine-readable identifier and the directly readable identifier.

22. The system as recited in claim 21 further comprising a computer configured to translate and display in a readable form on a display the at least one of the machine-readable identifier and the directly readable identifier detected by the digital camera.

23. The system as recited in claim 21 further comprising a computer, wherein the machine-readable identifier includes a bar code, and the computer includes a decoder configured to detect the barcode.

24. The system as recited in claim 21 further comprising a computer, wherein the directly readable identifier includes an alpha-numeric, and the computer includes an OCR system configured to detect the alpha-numeric.

25. The system as recited in claim 1 wherein the display and the frame form an integral unit.

26. The system as recited in claim 1 wherein the display is designed as a separate unit and is positioned along with the frame.

27. The system as recited in claim 1 wherein at least a first and a second window can be displayed on the display.

28. The system as recited in claim 27 wherein the first window includes a display of a pair of cross hairs configured to provide a user-indication of a position on the slide at which a microscopic image currently displayed on the display is acquired.

29. The system as recited in claim 1, wherein the first imaging beam path provides a macroscopic image to the camera and the second imaging beam path provides a microscopic image to the camera.

30. The system as recited in claim 1, further comprising an objective lens disposed in the second imaging beam path so as to provide a microscopic image to the camera, and wherein the first imaging beam path provides a macroscopic image to the camera.

\* \* \* \* \*